United States Patent
Bakalash et al.

(10) Patent No.: US 8,754,904 B2
(45) Date of Patent: Jun. 17, 2014

(54) VIRTUALIZATION METHOD OF VERTICAL-SYNCHRONIZATION IN GRAPHICS SYSTEMS

(75) Inventors: Reuven Bakalash, Shdema (IL); Ilan Grinberg, Kiryat Ono (IL); Natalya Segal, Kfar Netter (IL)

(73) Assignee: Lucidlogix Software Solutions, Ltd., Netanya (IL)

( * ) Notice: Subject to any disclaimer, the term of this patent is extended or adjusted under 35 U.S.C. 154(b) by 249 days.

(21) Appl. No.: 13/437,869

(22) Filed: Apr. 2, 2012

(65) Prior Publication Data

US 2012/0262463 A1  Oct. 18, 2012

Related U.S. Application Data

(60) Provisional application No. 61/471,154, filed on Apr. 3, 2011.

(51) Int. Cl.
  *G09G 5/00* (2006.01)
  *G09G 5/36* (2006.01)
  *G06T 1/00* (2006.01)
  *G06F 15/00* (2006.01)

(52) U.S. Cl.
  USPC .......................................... 345/611; 345/501

(58) Field of Classification Search
  CPC ....... G09G 5/001; G09G 5/003; G09G 5/006; G06T 15/005; G06T 1/60
  USPC ........ 345/611, 545, 548; 463/31; 375/240.13, 375/240.25, 240.29
  See application file for complete search history.

(56) References Cited

U.S. PATENT DOCUMENTS

| | | | | |
|---|---|---|---|---|
| 5,267,334 | A  * | 11/1993 | Normille et al. | 382/236 |
| 7,397,478 | B2 * | 7/2008 | Jiang | 345/545 |
| 7,983,495 | B2 * | 7/2011 | Nakai et al. | 382/232 |
| 8,063,910 | B2 * | 11/2011 | Swic | 345/539 |
| 2006/0007199 | A1* | 1/2006 | Gilbert | 345/204 |
| 2012/0081580 | A1* | 4/2012 | Cote et al. | 348/231.99 |

* cited by examiner

*Primary Examiner* — Kee M Tung
*Assistant Examiner* — Wei Yuan
(74) *Attorney, Agent, or Firm* — Eitan, Mehulal & Sadot

(57) ABSTRACT

Vertical synchronization (v-sync) in prior art prevents video tearing artifacts by keeping the video pipeline synchronized with the monitor. Such technique keeps the frame rate of the rendering engine equal to monitor's refresh rate. However, it suffers from two substantial shortcomings: performance limitations and input lag, both of which are critical in real-time applications such as video games and professional applications (e.g. 3D CAD). The different embodiments of present invention, termed virtual vertical-synchronization (Virtual v-sync), eliminate tearing artifacts, while solving the shortfall of performance by shortening or dropping undisplayed frames, and solving the input lags by removing frame blocking. Any frame rate is achievable, independently of the monitor refresh. Two additional uses of the virtual vertical-synchronization are cloud gaming improvement and power consumption control.

19 Claims, 20 Drawing Sheets

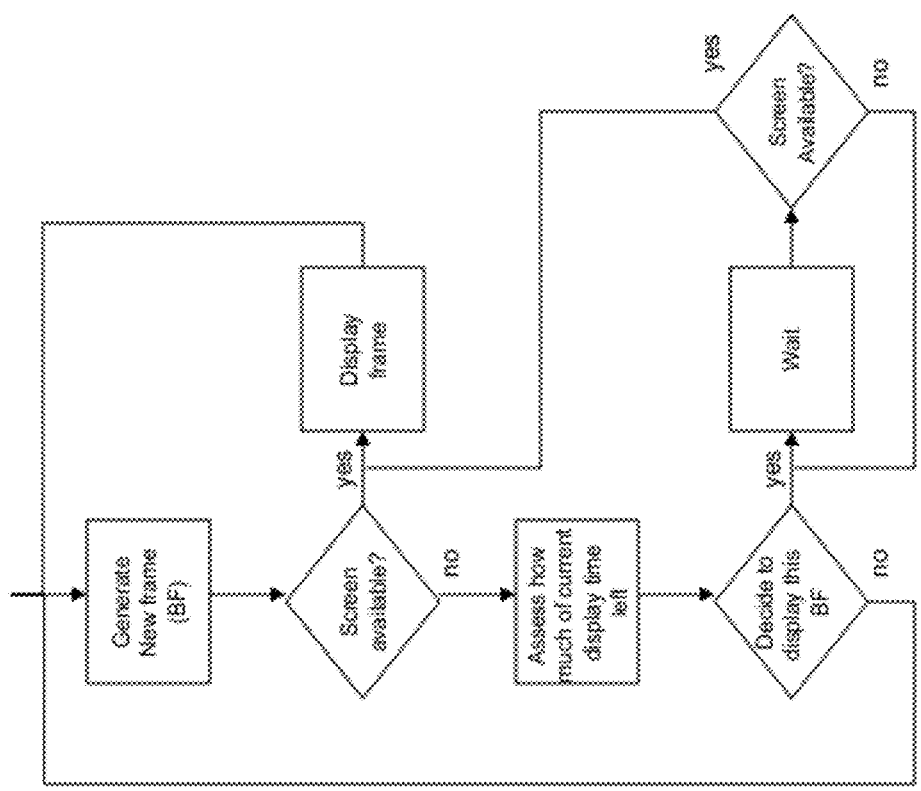

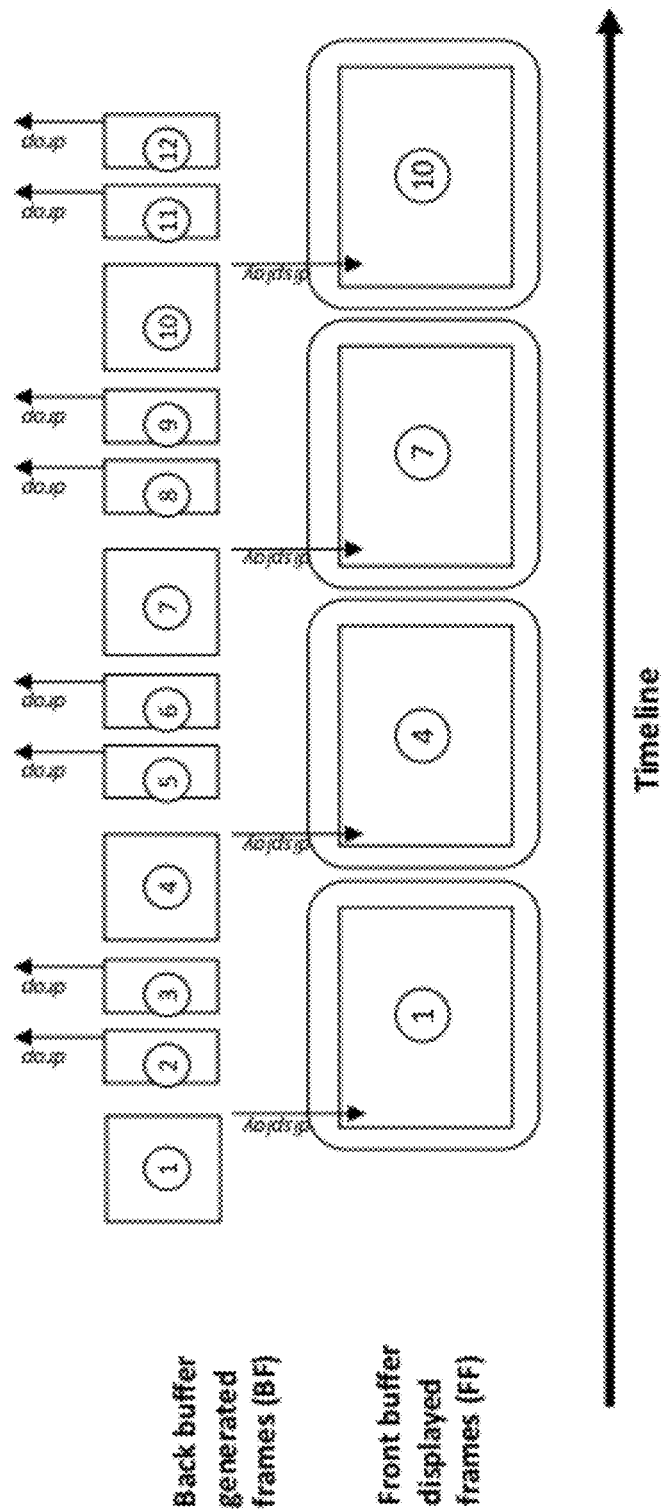

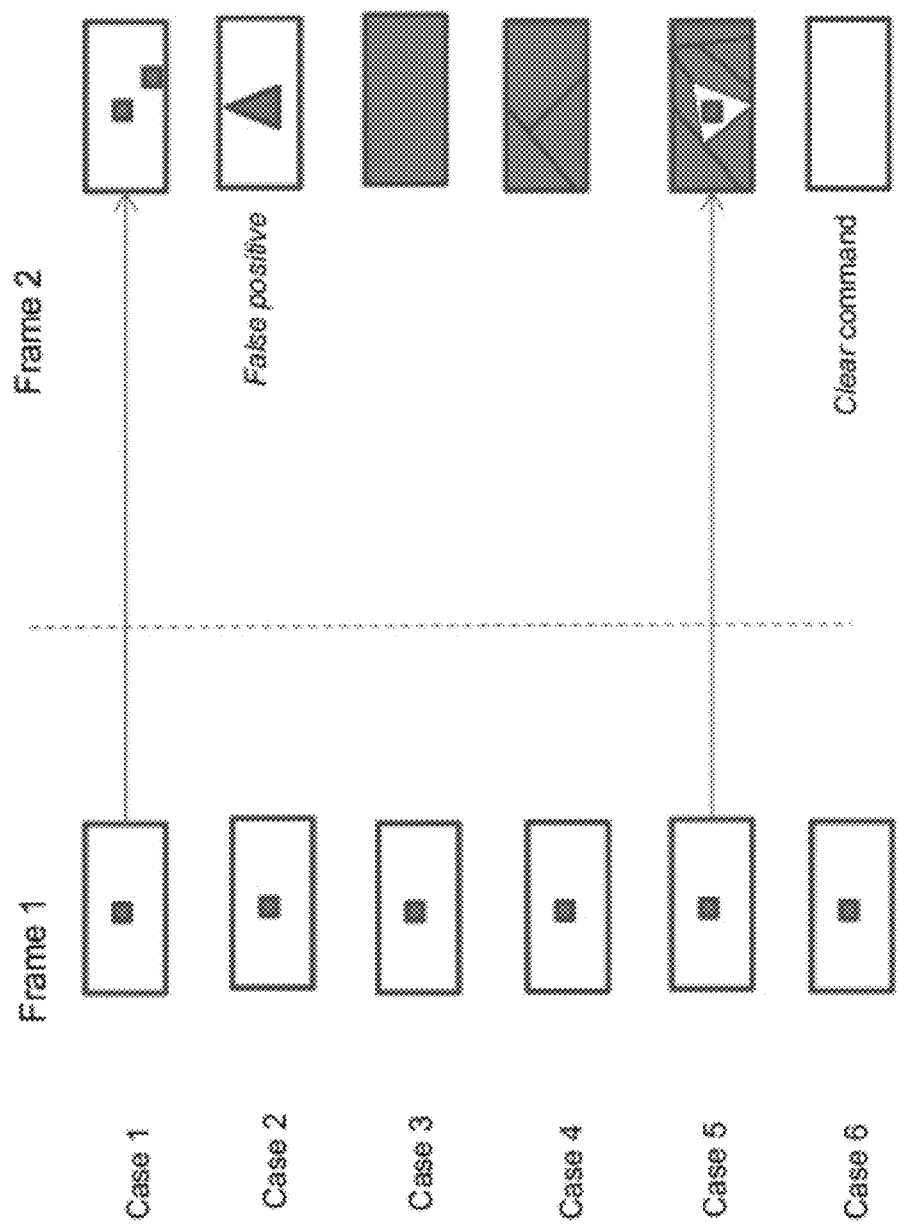

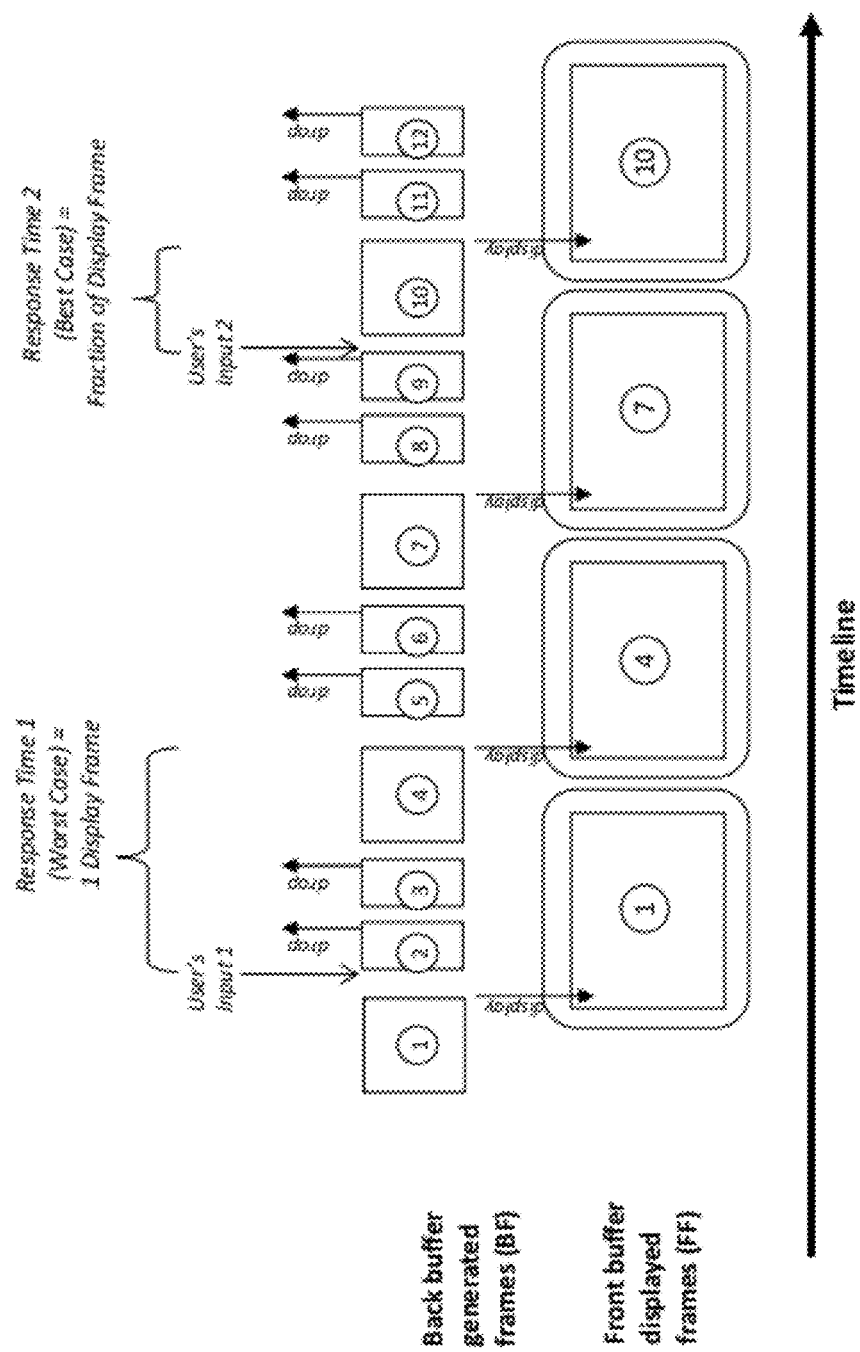

|  | FPS |  | CPU [W] |  | GPU [W] |  | Total [W] |  |
|---|---|---|---|---|---|---|---|---|
| Native | 138.00 |  | 19.19 |  | 84.60 |  | 103.79 |  |
| Concise, No Sleep | 310.00 | 124.64% | 25.27 | 31.70% | 62.37 | -26.28% | 87.63 | -15.57% |
| Concise, Sleep(3ms) | 165.00 | 19.57% | 13.76 | -28.29% | 59.97 | -29.12% | 73.73 | -28.96% |

Fig. 9.

VIRTUALIZATION METHOD OF VERTICAL-SYNCHRONIZATION IN GRAPHICS SYSTEMS

CROSS-REFERENCE TO RELATED CASES

The present Application claims priority of the U.S. Provisional Application No. 61/471,154 filed Apr. 3, 2011 entitled "Virtualization method of vertical-synchronization in graphics systems."

FIELD

The present invention relates generally to the field of computer graphics rendering, and more particularly, ways of and means for improving the performance of rendering processes supported on GPU-based 3D graphics platforms associated with diverse types of computing machinery.

BACKGROUND

Real-time 3D graphics applications such as video games have two contradictory needs. On the one hand there is the requirement for high photorealism; on the other hand a high frame rate is desired. In the video game industry the trend is to push the frame rate up to high FPS rates. However, when this overtakes the screen refresh rate (typically 60 FPS) a tearing artifact occurs, badly affecting the image quality. The higher the frame rate, the worse the tearing effect. Although tearing occurs when the frame feed is not synchronized with the screen refresh rate, it may also occur when FPS is less than the screen refresh rate. However, it is statistically more likely to be seen at higher FPS.

Tearing is a visual artifact in video or 3D rendered frames (typically in, but not limited to, 3D games) where information from two or more different frames is shown in a display device simultaneously in a single screen draw. FIG. 1a shows a series of application-generated back buffer frames with no v-sync, related to a series of displayed frames. In this example the application generates frames at a high rate of 120 FPS, while actual frames are displayed at a lower rate of 60 FPS, limited by the screen refresh rate. The back buffer generated frame (BF) is sent to the display as soon as it is created. When it is delivered in the middle of an ongoing displayed frame, the current scan line is discontinued, while the newly created frame goes on from the discontinued point. If the frame-to-frame data is different, a tearing effect may happen, distorting the image.

Tearing can occur with most common display technologies and video cards, and is most noticeable on situations where horizontally-moving visuals are commonly found. FIG. 1b illustrates tearing artifact in graphics display. This artifact occurs when the frame feed is not synchronized with the screen refresh. The common solution adopted by 3D game developers is v-sync (vertical synchronization), which is an option to synchronize the displayed frame with the screen refresh rate. V-sync is found in most computing systems, wherein the video card is prevented from doing anything visible to the display memory until after the monitor has finished its current refresh cycle.

The method of prior art v-sync is illustrated in FIG. 1c. In graphics display technology the generated image (frame) is stored first on the back buffer, and then by the mechanism of double buffering, it is switched to the front buffer for display on screen. In order to eliminate the tearing effect, a newly generated back buffer frame (BF) is prevented from being displayed on the ongoing front buffer displayed frame (FF). Consequently, the application frame rate is slowed down to the screen refresh rate. When vertical synchronization is in use, the frame rate of the rendering engine will be equal or less than the monitor's refresh rate, if the frame rate was originally higher than the refresh rate. Although this feature normally results in improved video quality, it is not without trade-offs in some cases. First, vertical synchronization is known to cause input lag, which is most noticeable when playing video games. Second, when one wishes to benchmark a video card or rendering engine, it is generally implied that the hardware and software render the display as fast as possible, with no regard to the monitor's capabilities or the resultant video tearing. Otherwise, the monitor and video card will throttle the benchmarking program, causing it to generate invalid results.

Video games, which have a wide variety of rendering engines, tend to benefit well from vertical synchronization, as the rendering engine is normally expected to build each frame in real time, based on whatever the engine's variables specify at the moment a frame is requested. However, because vertical synchronization causes input lag, it can interfere with games which require precise timing or fast reaction times. 3D CAD applications benefit as well from vertical synchronization. These applications are known for their slower frame rate due to large amounts of data. Their tearing effect is typically caused by the screen refresh mechanism, unsynchronized with the slower displayed frames.

A graphics system without v-sync has the best responsiveness, as demonstrated in FIG. 1d with two extreme user input cases. The response is between 0.5 and 1 display frames. In input case 1, which is the worst case delay, the response is one display frame, whereas in input case 2, the best case delay, the delay is 0.5 display frame. The v-sync input lag occurs due to the blocked generation of back buffer frames, as shown in FIG. 1e. The back buffer generated frame (BF) enters a waiting state until the screen becomes available, completing the currently displayed frame. The worst case is shown with user input 1, which comes at the beginning of displayed frame 1, and affects the display in displayed frame 3, causing a lag of 2 frames. The best case is exemplified on user input 2, initiated just before the start of displayed frame 3, and affects the image in display frame 4, causing a single frame lag. Single frame lag is considered normal.

Therefore, the v-sync of prior art solves the tearing artifacts, however it suffers from two major drawbacks: (i) performance penalties binding FPS to the screen refresh rate, and (ii) input lag that reduces the application's responsiveness. These two shortfalls are critical in real-time graphics applications.

SUMMARY

Vertical synchronization (v-sync) in prior art prevents video tearing artifacts by keeping the frame rate of the rendering engine equal to the monitor's refresh rate, if the frame rate originally tends to be lower or higher. However, this technique suffers from two substantial shortcomings: performance limitation and input lag, both of which are critical drawbacks in real-time applications such as video games.

The virtual vertical-synchronization (Virtual V-sync) of the present invention removes the performance shortfall by virtually allowing any frame-per-second rate, independent of the monitor refresh rate, and eliminates the input lag by removing frame blocking. The method is based on preventing excessive application-generated frames from being displayed; instead, the unpresented frames are dropped, or shortened first and then dropped. In order to eliminate artifacts caused by missing frames, inter-frame dependency is resolved.

The virtual vertical-synchronization method of some embodiments of the invention can work with any off-the-shelf GPU and computing system, independently of GPU make, model or size. The virtual vertical-synchronization of the present invention is the basis for two additional aspects of the invention: power consumption control of graphics systems and improved GPU utilization in cloud-based real-time graphics applications, such as cloud gaming.

BRIEF DESCRIPTION OF DRAWINGS

For a more complete understanding of practical applications of the embodiments of the present invention, the following detailed description of the illustrative embodiments can be read in conjunction with the accompanying drawings, briefly described below:

FIG. 3a. Flowchart of the 'hybrid' mode of Virtual Vsync.

FIG. 4b. The 'concise' mode of Virtual Vsync.

FIG. 4d. Various cases of inter-frame dependency.

FIG. 6. Responsiveness of the 'concise' mode.

FIG. 9. Comparison of power consumption between native mode and concise mode

DETAILED DESCRIPTION

Modes of Virtual Vertical-synchronization

The virtual vertical-synchronization (Virtual V-sync) of the different embodiments of present invention removes performance shortfalls by virtually allowing any high rate of frame-per-second, independent of the monitor refresh rate, and eliminates the input lag by removing the frame blocking mechanism. The term "monitor refresh rate" is the number of times in a second that display hardware draws the data. This is distinct from the measure of "application frame rate" of how often the application driving the graphics system can feed an entire frame of new data to a display. In case of an application frame rate that is higher than refresh rate, the "actual frame rate" of the graphics system is that of monitor refresh rate. In embodiment of present invention the excessive application frames, above the refresh rate, are assigned as "to-be-dropped" frames. These frames are dropped without rendering, or rendered only partly in case of inter-frame dependency, as explained hereinafter. "Frame blocking" refers to keeping the rendered frame on hold, until the display hardware completes displaying the previous frame. Frame blocking causes input lags, deteriorating graphics system responsiveness.

There are three embodiments of the present invention; (i) the basic mode in which the subsequent frame is generated by the application, then at the time of display it is displayed or dropped, depending on screen availability. (ii) the hybrid mode, where the subsequent frame is generated, but its display depends on the time remaining for the currently displayed frame, and (iii) the concise-frame mode where the time remaining for the currently displayed frame is assessed in advance, and the immediate drop of a fully generated frame is replaced by creating a concise frame with reduced number of draw calls, which is then dropped. In the following description the term BF relates to subsequent back buffer generated frames, and FF stands for front buffer frames displayed at a restricted refresh rate.

Figure 2A:
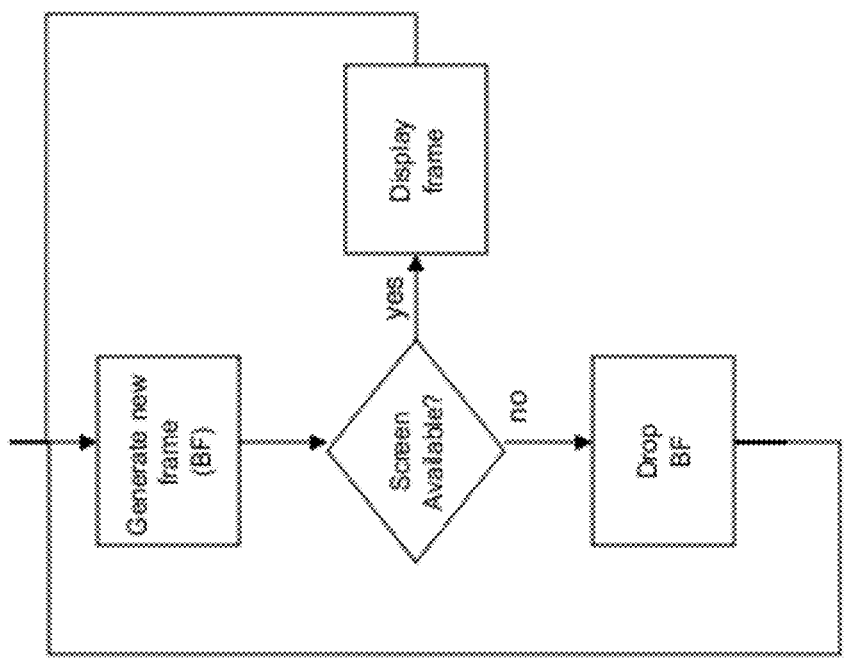
FIG. 2a. Flowchart of the 'basic' mode of Virtual Vsync.
Figure 2B:
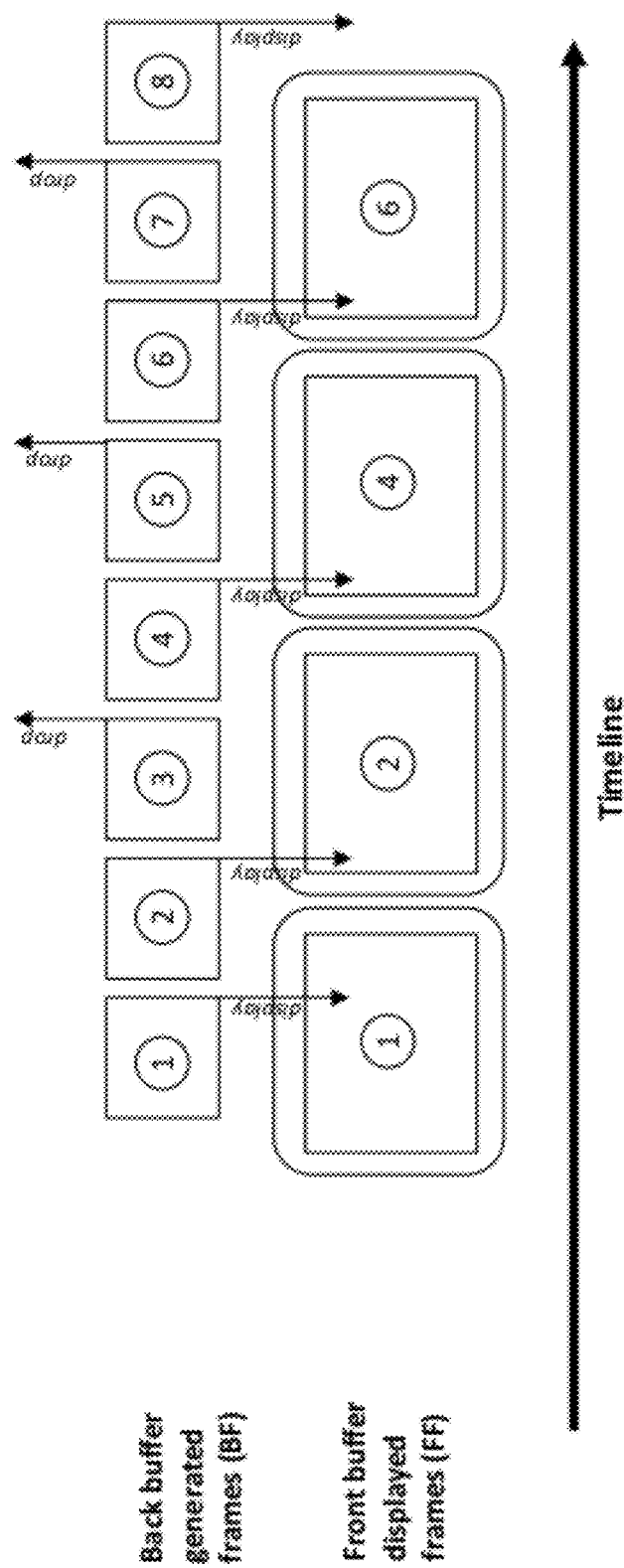
FIG. 2b. Frame sequence of Virtual Vsync.

FIG. 2a shows a flowchart of the Virtual V-sync basic mode. In this mode all the BF are unconditionally generated, as if all are going to be displayed. A frame, when completed, is either sent to display or dropped without being displayed, depending on screen availability. No frames are blocked by the application. Tearing is eliminated because the undropped frames are never presented to display in the middle of the current FF; they always start a new screen scan upon termination of previous one, beginning from starting point on the screen. Consequently, the FPS performance is high and at the level of a non-v-sync unlimited frame rate, but without the tearing artifacts. This is clearly illustrated in FIG. 2b, in the case of an application rendering rate of 120 FPS, while the screen refresh rate is 60 FPS.

Figure 3B:
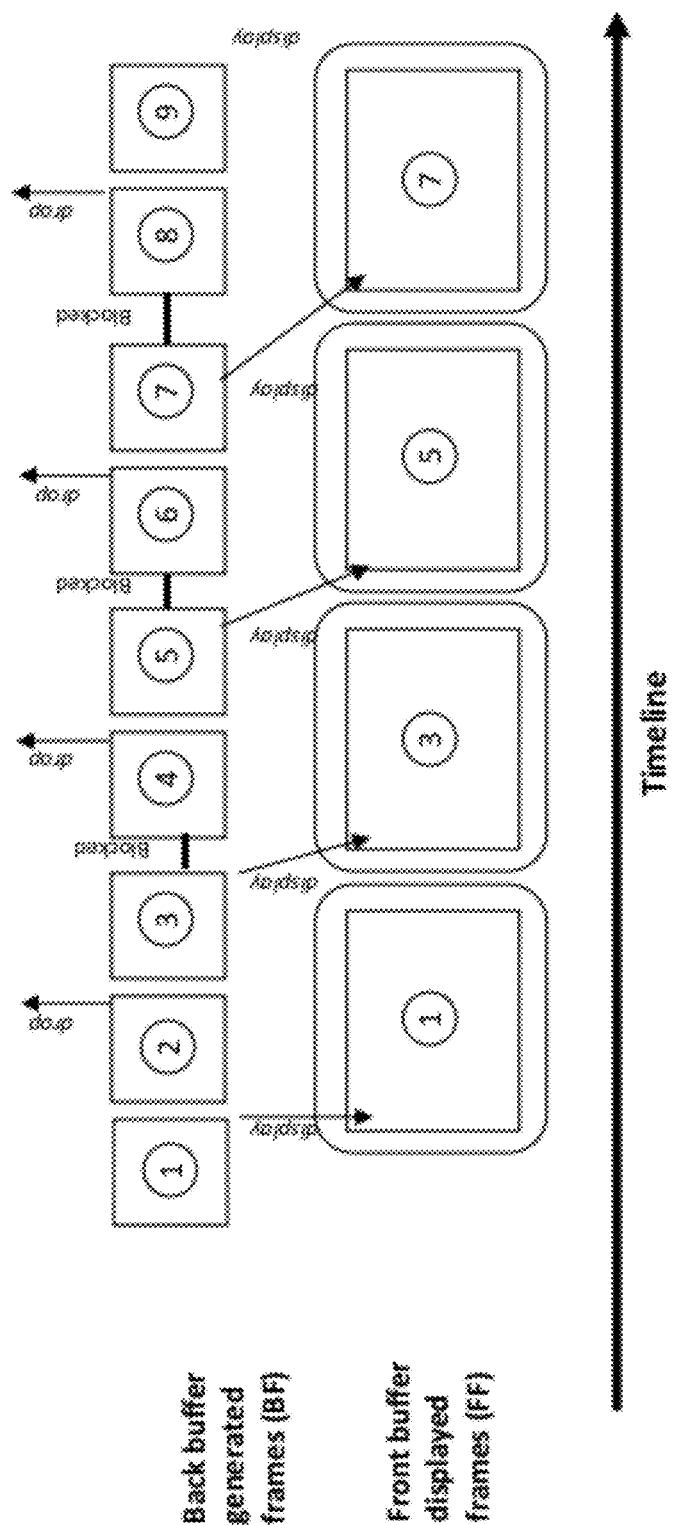
FIG. 3b. Frame sequence of the hybrid mode of the Virtual Vsync.

The hybrid mode, based on controlled frame blocking, allows higher FPS than the prior art v-sync. It is flowcharted in FIG. 3a. The subsequent frame (BF) is unconditionally generated, but its display depends on the required blocking period. If the screen is available upon completion of BF, the back buffer is sent for display, otherwise the time remaining for the currently displayed FF is assessed. If the time remaining is below a given threshold, the next BF is blocked until the current BF goes to display. If the time remaining is above the given threshold, the BF is dropped and a new BF starts. In this way the blocking stage is controlled, allowing higher FPS than the prior art v-sync. FIG. 3b shows the relation between the BF and FF sequences. For example, the generation of BF 4 is blocked until BF 3 is presented to display. Then, after completion of BF 4, the time remaining for its display is determined to be too long, above the threshold, and consequently BF 4 is dropped. BF 5 starts right away without blocking, and is switched to the front buffer for display immediately upon completion.

Figure 4A:
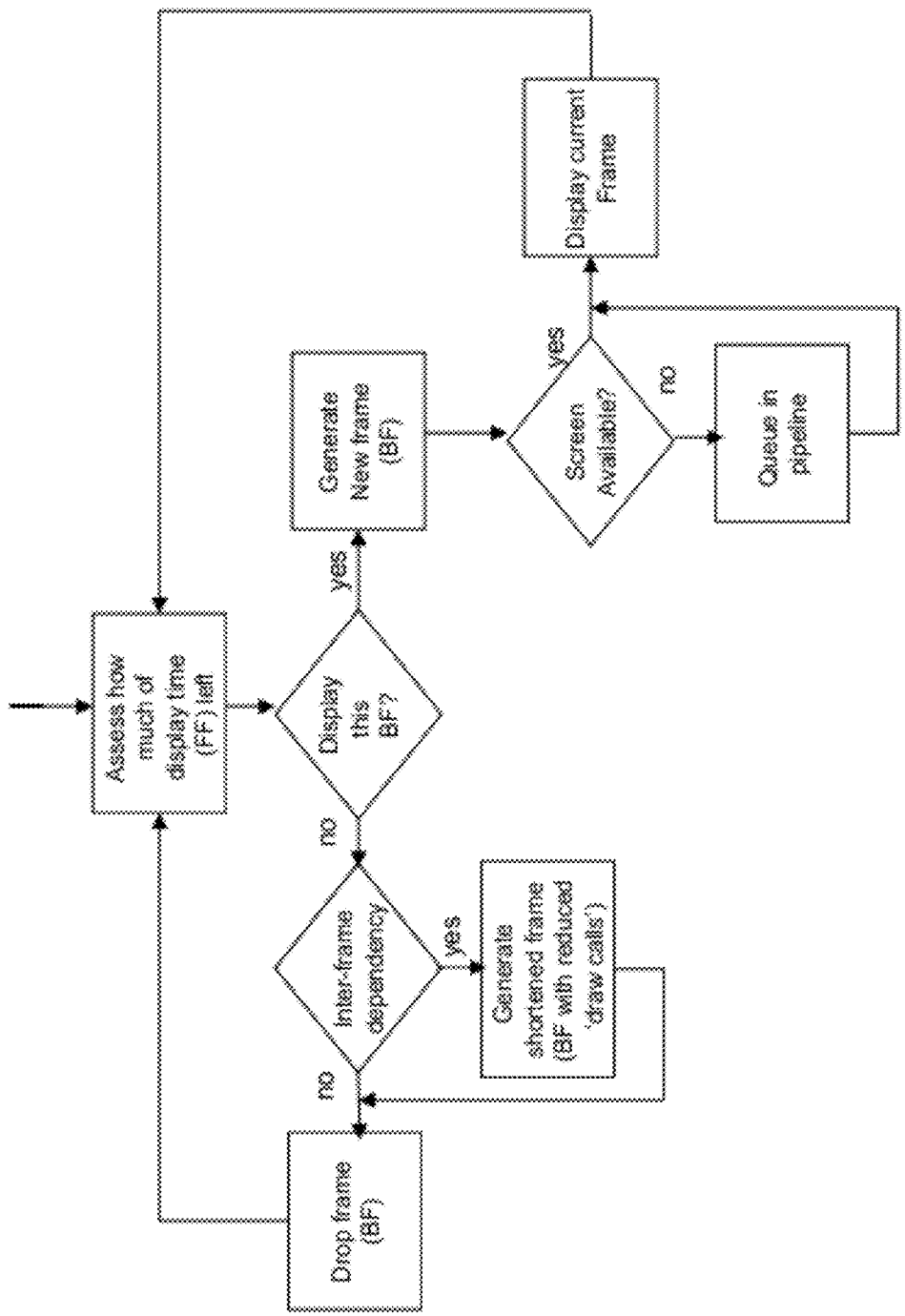
FIG. 4a. Flowchart of the 'concise' mode of Virtual Vsync.

The concise frame mode is based on shortening before dropping or dropping without shortening the undisplayed frames, allowing higher FPS. The screen availability upon completion of BF is assessed in advance. As shown in the flowchart of FIG. 4a, the BF is generated in its entirety if it has a chance to be displayed, otherwise it is shortened by turning redundant tasks that are not required for subsequent frames, i.e. no inter-frame dependency, to non-operational. Frame dependency is a critical issue in this context, and will be discussed hereinafter. For each newly started BF a timing assessment is done. If the time remaining for the currently displayed FF is too long, in event of inter-frame dependency the BF is generated with a reduced number of draw calls, creating a concise frame, and dropped, or in event of no inter-frame dependency the frame in its entirety is dropped. If a timing match for display is positively assessed, then a full BF is generated and displayed, if screen is available. Otherwise it keeps waiting. There is no frame blocking in this mode. The actual implementation on Graphic Pipeline is that you can send the "Present" command and continue to the next frame. The present will be queued in the pipeline and won't be blocked. The actual blocking happen usually a few draw-calls after "present", when the actual pipeline is full. So, there is no actual restriction to execute the "present" only if you can guarantee that the display will take the BF and Switch to FB almost immediately after the "present" was sent. FIG. 4b shows the relation between the BF and FF sequences. For example, the BF 5 and 6 are created as concise frames and dropped, BF 7 on the other hand is fully generated, including draw calls, and sent to display.

Resolving Inter-frame Dependency

Figure 4C:
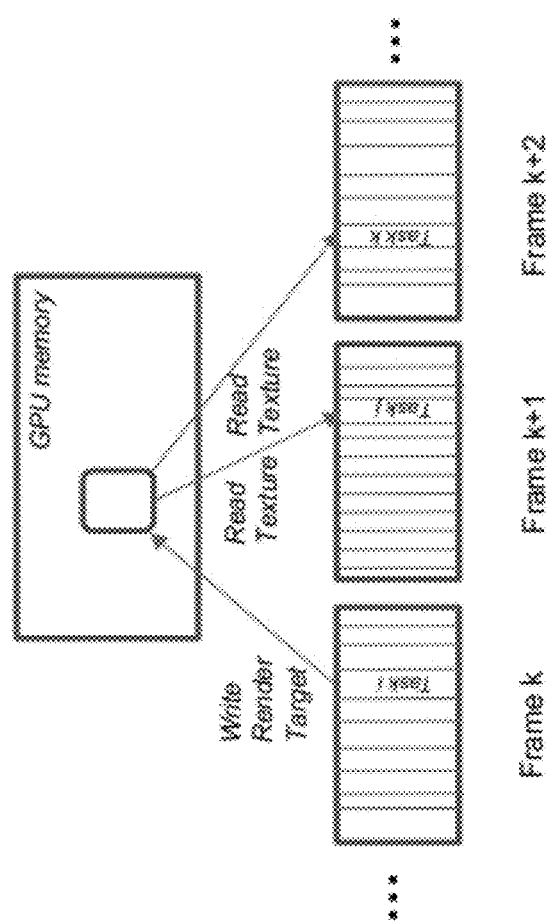
FIG. 4c. The principle of inter-frame dependency.

A frame becomes subject to inter-frame dependency if a graphics entity (e.g. texture resource) created as part of the frame, by means of a render target task (herein termed shortly as 'task'), evoked by a draw call, becomes a source of reference to successive frames. Inter-frame dependency is illustrated in FIG. 4c. $Task_i$ in the first frame creates a render target for repeated use as a texture in successive frames by $task_j$ in frame k+1 and by $task_k$ in frame k+2. If $task_i$ is purged as part of the reduction of frame k into a concise frame, this texture resource will be missing in subsequent frames, causing an artifact. For example, an image of a mountain reflected in a fishpond is created only once per multiple frames, but this image is incorporated in all consecutive frames. The reflected mountain image is stored as an intermediate render target (RT). This RT becomes an input resource, a texture, for succeeding frames. If that draw call is dropped from the referenced frame, the image of the reflected mountain disappears from successive frames as well, causing an artifact.

A frame can be seen as a flow of tasks $(T_1\text{-}T_2\text{-}T_3\text{-}\ldots T_N)$, when each task has its input and output resources: vertex buffer (VB), index buffer (IB), texture, render target (RT), shaders, and states. An output B of task $T_k$ at frame N is used as an input to task $T_I$ of frame N+1. If that input B is missing, the result is an artifact. For that reason, at the time of formation, inter-frame dependency between tasks must be revealed and solved in order to prevent artifacts.

Practically speaking, there are two different methods to deal with the inter-frame dependency issue. The simple one is a "per application" method based on an individual investigation of each application, making a list of all resources that ought to be provided by one of the preceding frames. The tasks that generate those resources shouldn't be dropped. However, this is a customization method; it is manual and expensive. It requires a human learning curve for each application. Consequently, an automatic method for solving inter-frame dependency is needed.

In one embodiment of the present invention the automatic method for solving inter-frame dependency is based on a Dependency Handler software module, responsible for preventing artifacts caused by frame dependency. For every resource, the module must identify the updating task. Whenever a dependency exists, it must make sure that the successive frames received all the required resources. This is done by keeping the updating task as part of the concise frame, while other draw calls can be removed. The resource is then generated, and from this point on the resource becomes available to all successive frames.

FIG. 4d shows different cases of inter-frame dependency. Resources of successive frames are shown. A resource in frame 1 is set by the command Set Render Target. In frame 2 this resource is called up by the command Set Texture. It is essential to verify in frame 2 whether the called up resource is dependent on the previous frame or not. Case 1 is a simple example of dependency when the final result in frame 2 depends on the drawn element in the preceding frame. In case 1 a small rectangle was created by the first frame. In the next frame the dependency disappears only if the rectangle is completely overdrawn. In case 1 the original rectangle appears in the final result as well, which makes the second frame dependent on the first one. In case 2 the triangle overwrites the rectangle, removing the dependency.

The difficulty stems from the need to recognize in real time whether the overwriting was complete or not. In case 3 the answer is made simple because of overwriting by a full square quad or in case 6 a Clear command, removing any chance for dependency. In case 4 the full squad is assembled from a puzzle of smaller polygons, which raises uncertainty. If the polygons fully cover the texture, no dependency exists. The occlusion query command, counting the number of drawn pixels, can help. However, if the texture is not completely covered, the dependency is questionable: both options still exist. Case 5 shows an example of incomplete overdraw, leaving the dependency in place. In the case of uncertainty, we need to take a "false positive" approach, meaning that we must assume dependency, in order to eliminate any chance of artifacts.

Responsiveness

Figure 1A:
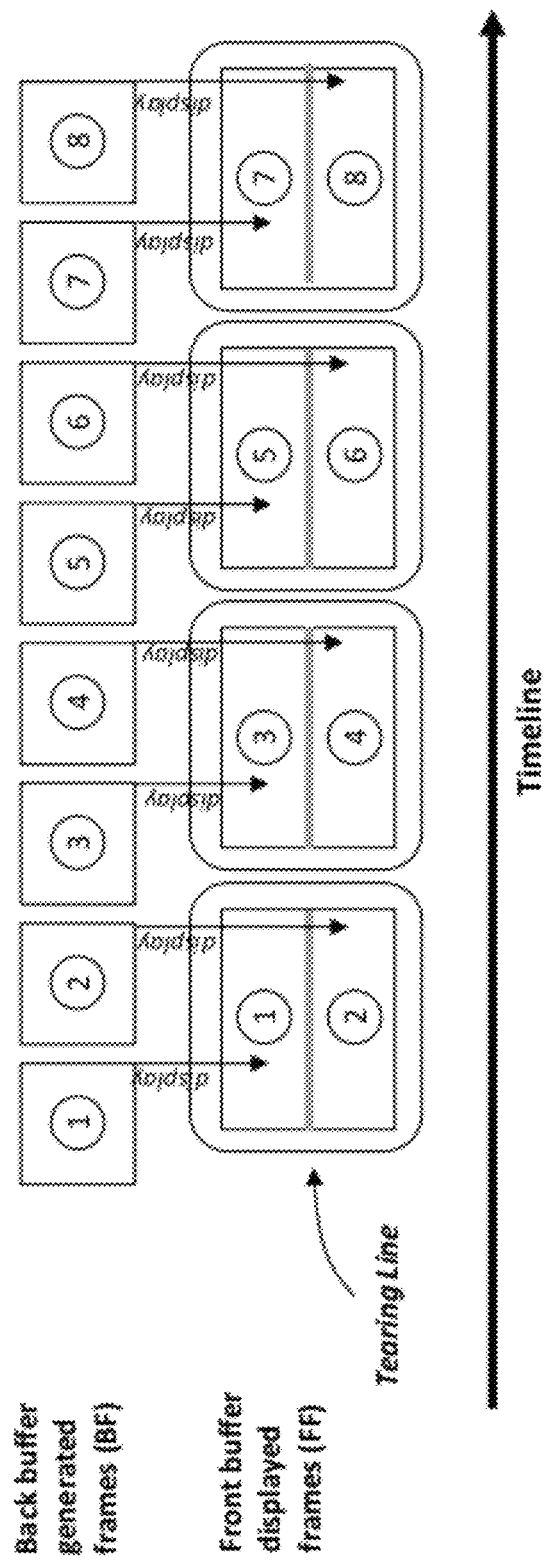
FIG. 1A. Prior art. A series of application-generated back buffer with no v-sync.
Figure 1B:
FIG. 1b. Prior art. The effect of tearing.
Figure 1C:
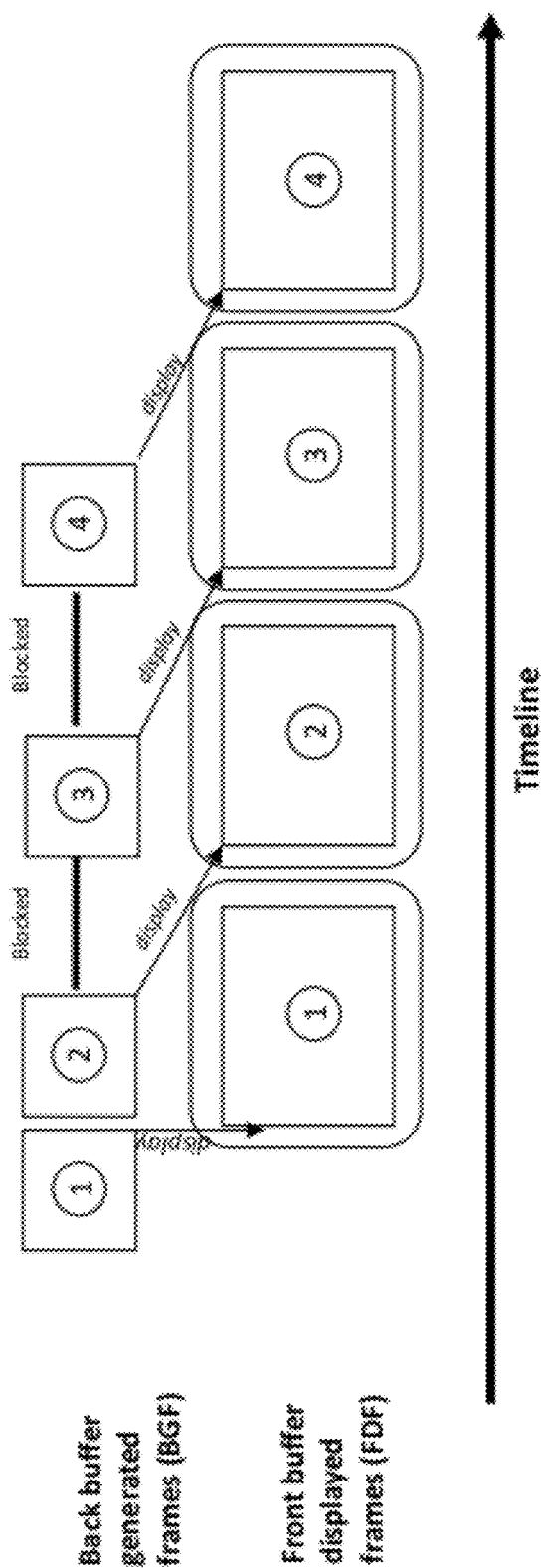
FIG. 1c. Prior art. The method of v-sync.
Figure 1D:
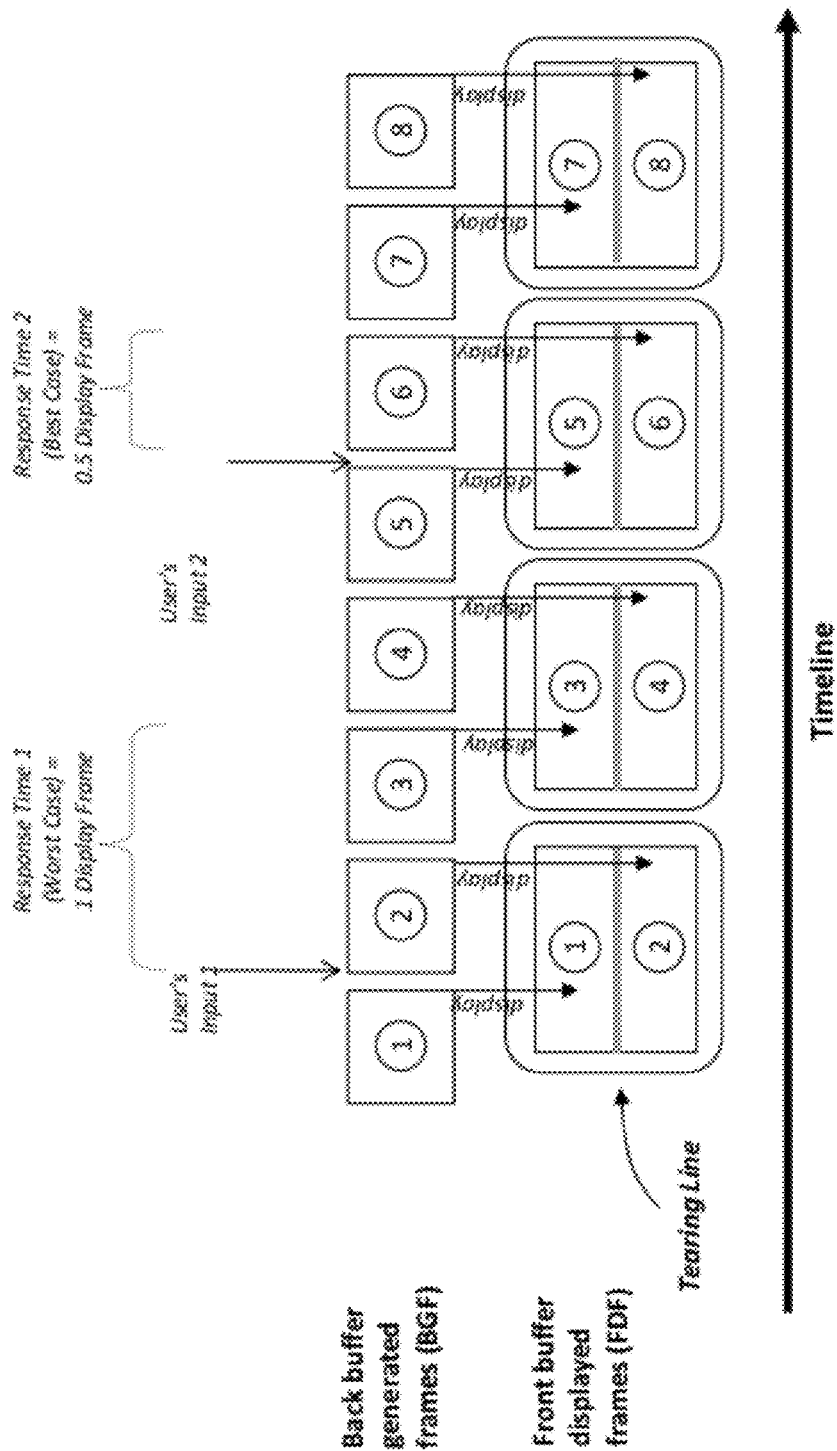
FIG. 1d. Prior art. Responsiveness of graphics system without v-sync mechanism.
Figure 1E:
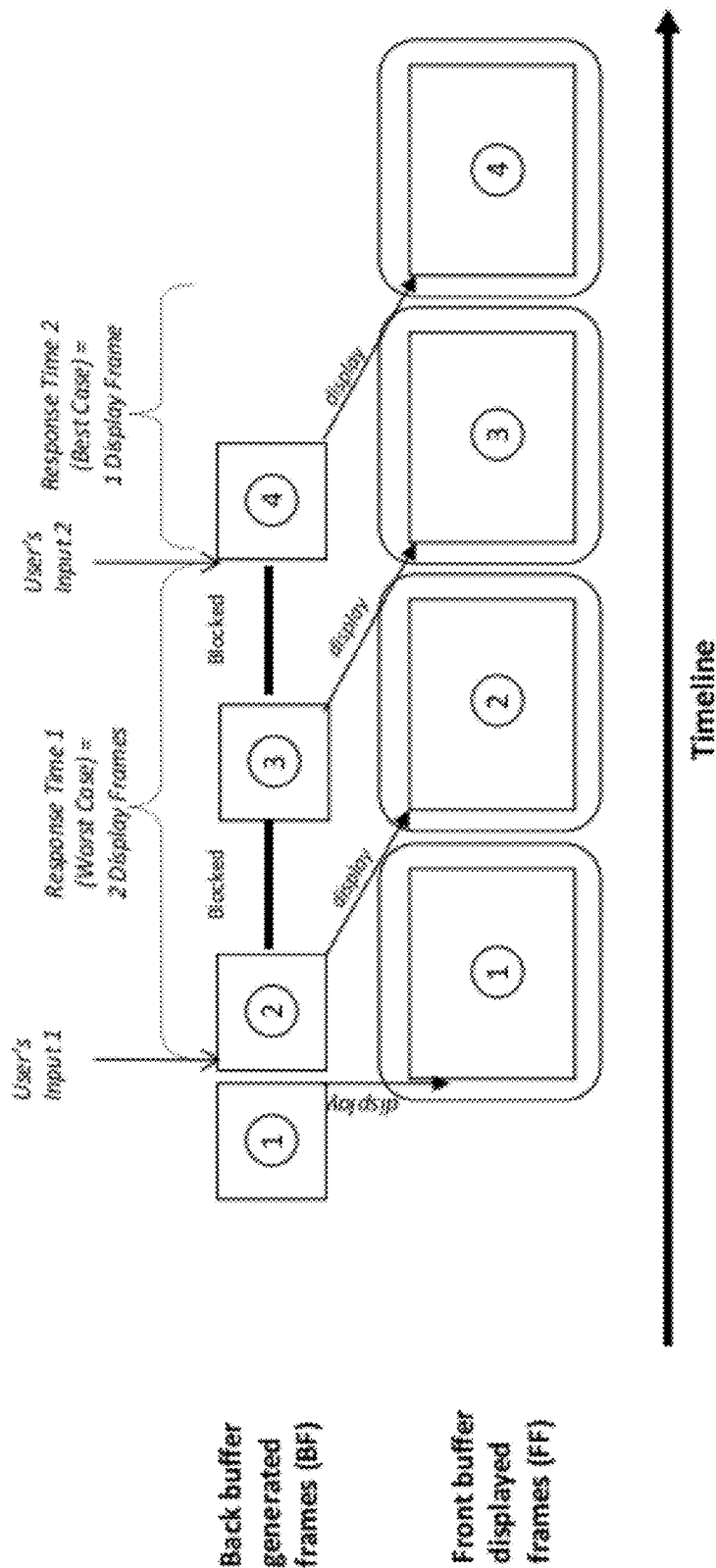
FIG. 1e. Prior art. Deteriorated responsiveness to user input, due to frame blocking by the application.
Figure 5A:
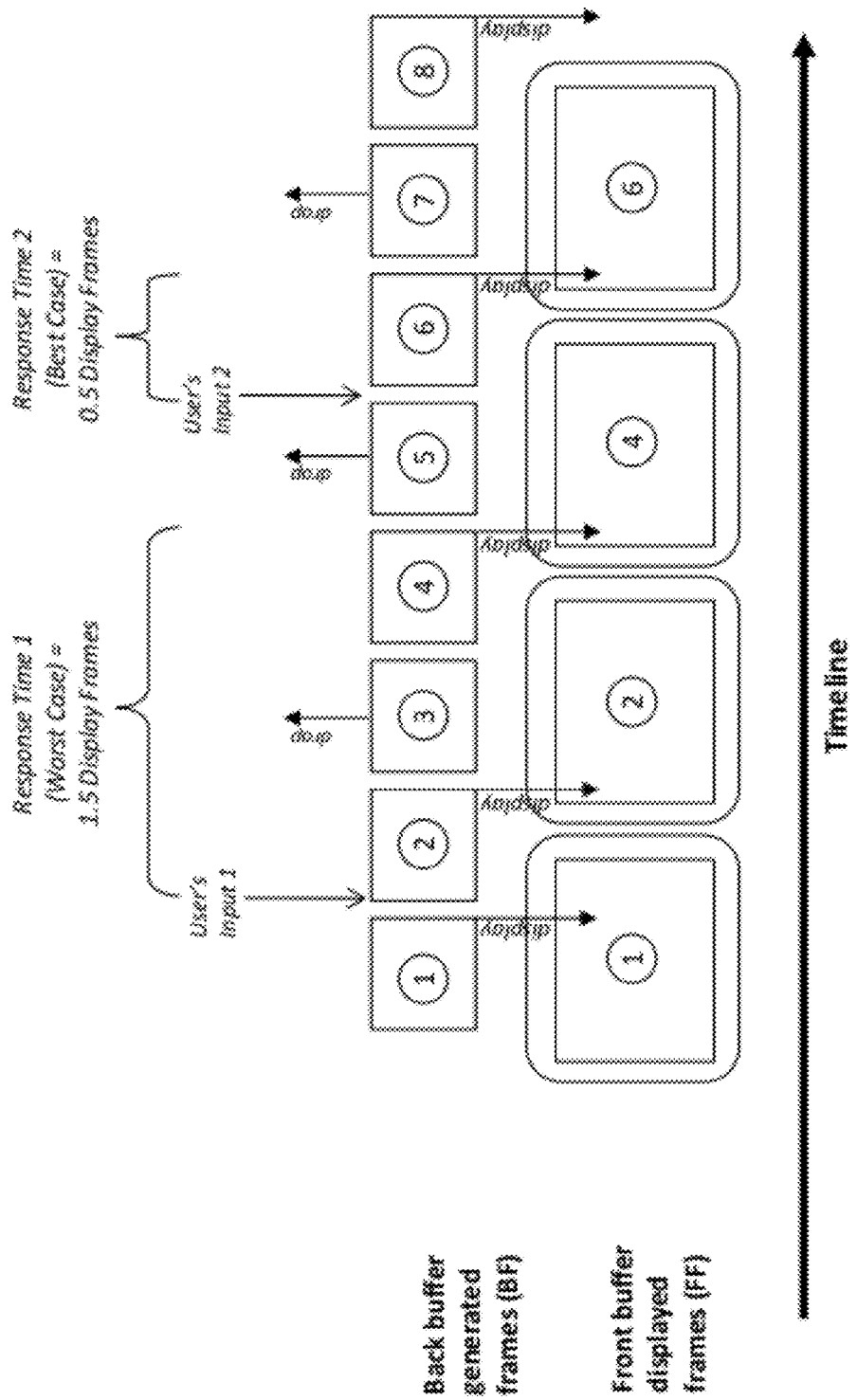
FIG. 5a. Responsiveness of the basic mode of the Virtual Vsync method.
Figure 5B:
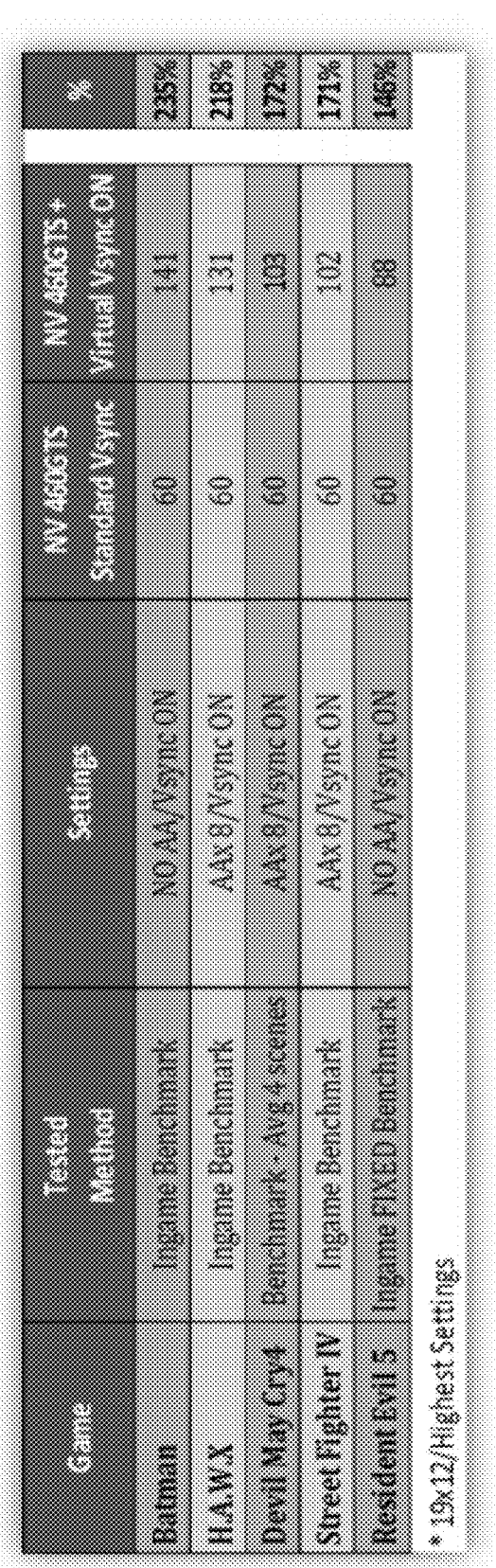
FIG. 5b. Comparison chart of responsiveness: prior art's standard v-sync vs. one embodiment of present invention's Virtual Vsync.

Some embodiments of the present invention minimize input lags to the level of graphics systems without v-sync solutions. As mentioned before, input lags deteriorate the responsiveness of real-time graphics systems, interfering with games which require precise timing or fast reaction times. The high responsiveness of the Virtual v-sync method of the embodiment of the present invention is illustrated in FIG. 5a. The basic mode is analyzed, in terms of worse and best case. Worse case is shown on user input 1, which comes at the beginning of BF 2, therefore it can be reflected only in BF 3. However, BF 3 is dropped, therefore its response is shown only on BF 4 which is displayed as FF 4. The lag is 1.5 frames. The best case is exemplified on user input 2, initiated just before the start of BF 6, and coming into effect at the end of BF 6, therefore visible by display frame 6, causing a delay of only 0.5 display frame, equal to the best case of non-v-sync graphics systems (see FIG. 1d). It is significantly better than that of the prior art's v-sync (FIG. 1e) in which the worst-case lag is 2 display frames, and the best case is 1 display frame. The responsiveness comparison (FIG. 5b) between the prior art's v-sync method and the Virtual v-sync of the embodiment of the present invention is based on real benchmarking. Testing was done on video game applications. FPS (frames per second) reflects responsiveness. Tests performed and reported in FIG. 5b indicate improvements on the order of 100% to 250%, but these results are representative only, and actual improvement may be less than 100% or greater than 250%. The concise mode embodiment of present invention is even more responsive due to shortening BFs while dropping draw calls, as shown in FIG. 6. In the worst case the delay is of a single display frame, whereas in the best case it is only a fraction of a display frame, depending on the difference between FPS and screen refresh rate.

An additional way to improving responsiveness in some embodiments is by shortening the queue of driver-formed frames in the CPU. The frames are queued prior being sent to the GPU. The typical queue length in a CPU is of three frames, with no blocking, causing a constant input lag. This lag can be shortened by decreasing the queue to one or two driver-formed frames.

In summary, the different embodiments prevent video tearing artifacts, performance limitations and input lag in graphics systems, all of which are critical in real-time applications.

Eliminating Micro Stuttering

Micro stuttering is inherent in every technique of dropping frames in a non-uniform way. Typically, micro stuttering is a term used in computing to describe a quality defect inherent in multi-GPU configurations, using time division (alternate frame rate). It manifests as irregular delays between frames rendered by the multiple GPUs. This effect may be apparent when the flow of frames appears to stutter, resulting in a degraded game play experience in video games, even though the frame rate seems high enough to provide a smooth experience.

In different embodiments, when the shortening and dropping frames are practiced, a micro stuttering may appear. It causes two deteriorating effects: (i) a non fluent image (stuttering image) when the animated contents do not develop smoothly, and (ii) a non-uniform pace of displaying frames (stuttering display). The stuttering of an image stems from the discrepancy caused to the virtual timeline at the animated application by missing frames from the timely sequence. The virtual time must then be compensated accordingly, to eliminate image stuttering.

Figure 7:
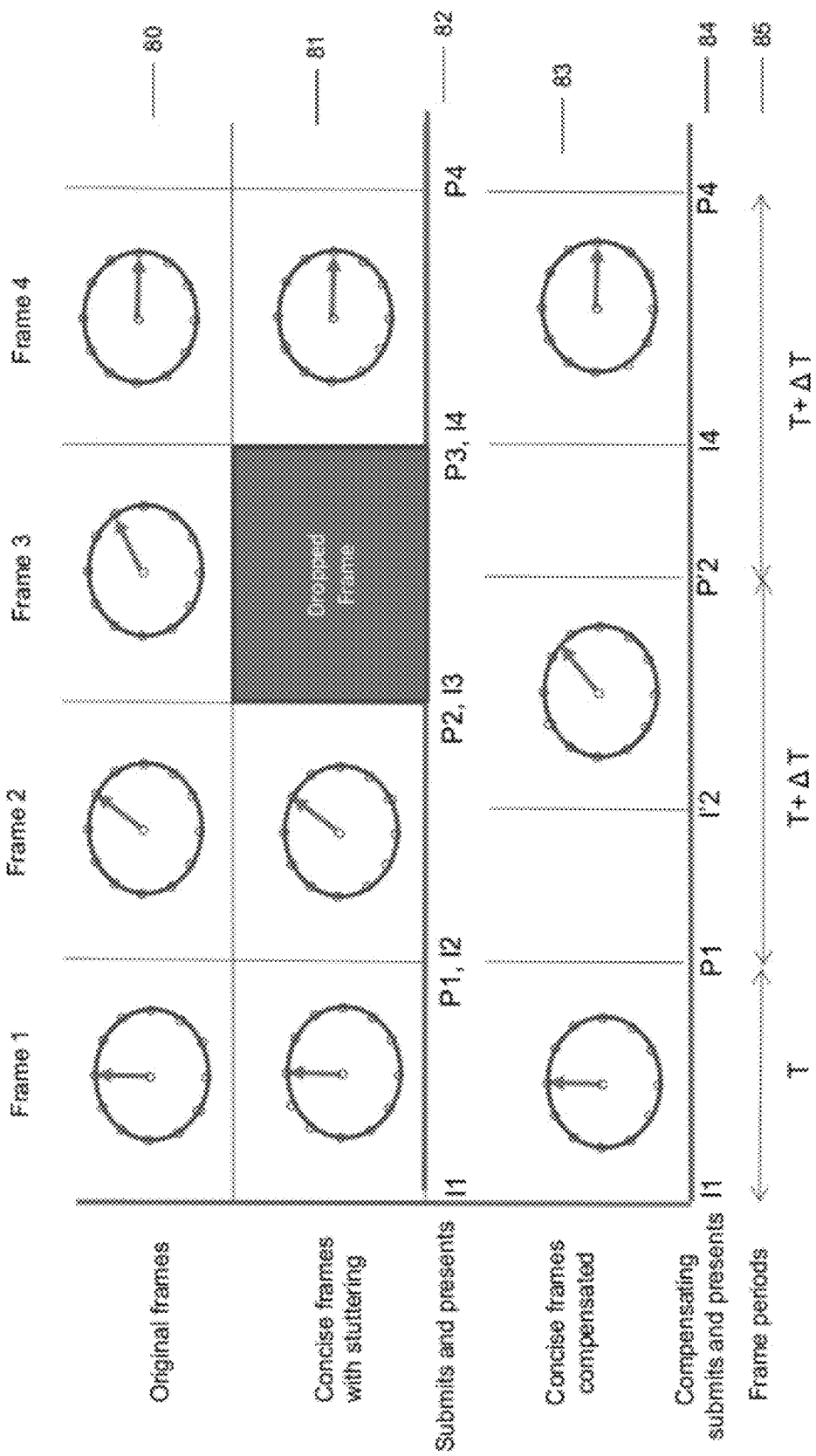
FIG. 7. Stuttering and its solution.

FIG. 7 shows a stuttering case, including stuttering image and stuttering display. The way to fix the stuttering effect is shown as well. The original sequence of frames is shown in row 80. There are 4 frames with a time-sensitive content. Four frames are shown, submitted to the GPU at I1-I4 times, and displayed by the GPU due to "present" commands, P1-P4. In row 81 a concise mode is shown, having dropped the third frame. This drop would result in stuttering. After the drop, only the frames 1, 2, and 4 remain, with presents P1, P2, and P4 respectively. The present command P3 is missing, resulting in stuttering display, due to non-uniformly spaced present commands. The remedy comes from changing the times for the frames 2 and 4. The duration time of frames 2 and 4 compensate for the missing frame. Both frames are being appended with an additional time of ΔT. As shown, the presenting time of frame 2 is shifted from P2 to P'2, delayed by T+ΔT, while ΔT in this example equals T/2. Frame 2 submitted by the application (CPU) to GPU at the original time I2, but presented with a ΔT delay at P'2, would be incorrect at the time of display, causing a stuttering image. The resulting image would be incorrect at the time of present. To fix this, the application should send a frame for rendering on time, according to its internal clock; frame 2 must be submitted to the GPU at the new time I'2 and sent to display at P'2, as shown in FIG. 7.

In summary, in order to prevent stuttering of display as well as of image, the application clock must be controlled by timely submissions of frames to GPU, and timely presents to display. Same method should be applied for mouse and keyboard movements. Mouse and Keyboard movements should be manipulated to fit the actual presented frames in the same way as the applications clock was controlled.

Cloud Gaming

Another embodiment of the present invention matches the cloud gaming application. Cloud gaming is a type of online gaming that allows direct and on-demand streaming of games onto a computer through the use of a thin client, in which the actual game is stored on the operator's or game company's server and is streamed directly to computers accessing the server through the client. This makes the capability of the user's computer unimportant, as the server is handling the processing needs. The controls and button presses from the user are transmitted directly to the server, where they are recorded, and the server then sends back the game's response to the input controls.

Figure 8:
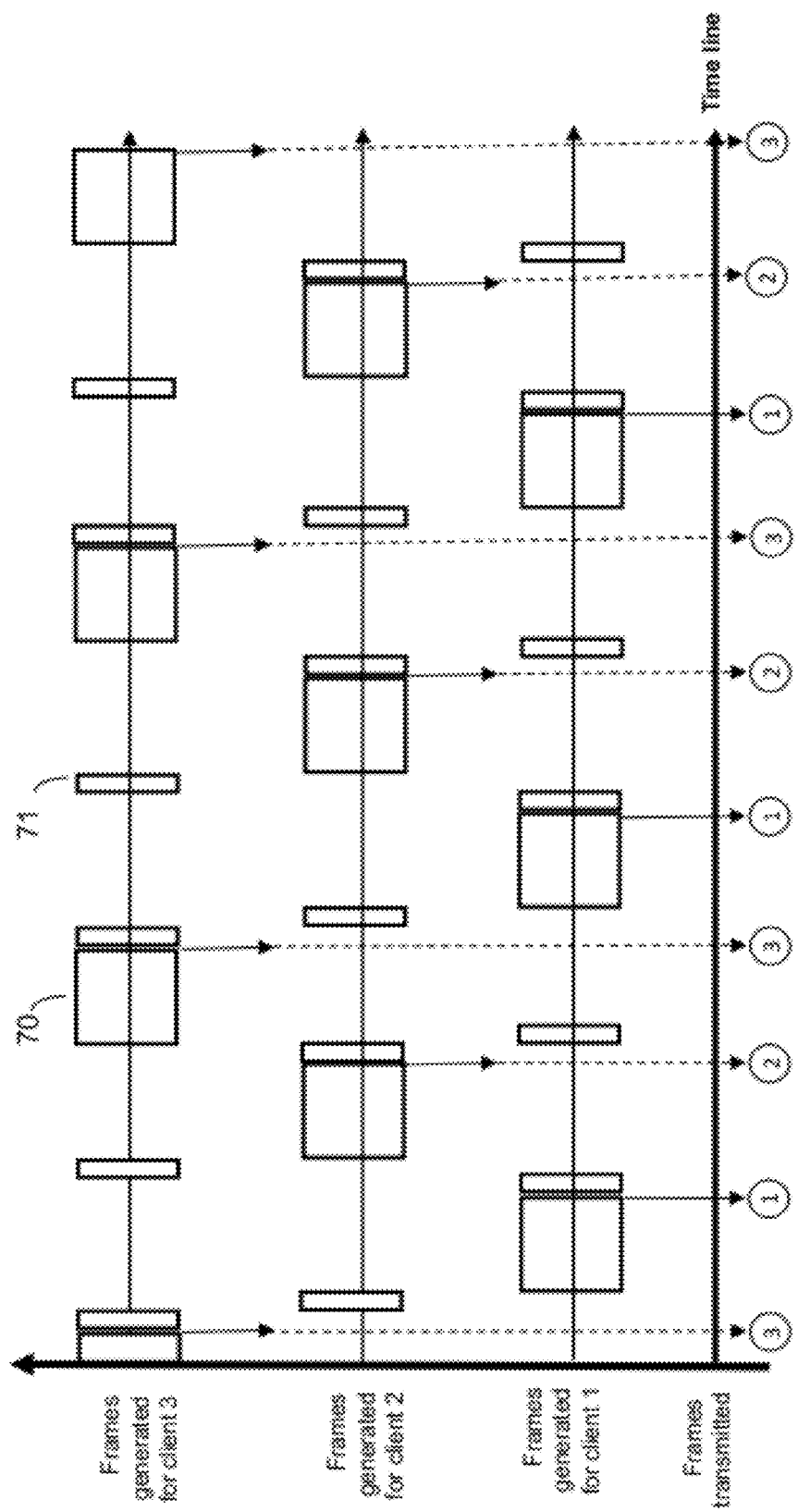
FIG. 8. Frame sequence of the cloud mode of Virtual Vsync.

High utilization of the GPU in cloud gaming is of significant importance. The more applications a GPU can run simultaneously, the higher its utilization. It is gained by usage of the concise mode along with the solution of inter-frame dependency, as described above. FIG. 8 depicts the cloud mode of Virtual Vsync. In the given example a single GPU generates simultaneously three independent streams of frames to three remote clients. Two different types of frames are generated: a full displayable frame (70), and a shortened frame with dropped draw calls (71). By cutting down frames, entirely or partly, without raising the frame rate, more applications can simultaneously run on a GPU, increasing its utilization.

Power Consumption Control

The graphics subsystem of a computing system is typically the largest power consumer. The power dissipated by a graphics subsystem is proportional to the frame rate: $P=C*FPS$, where P is the dissipated power and C is the heat capacitance. As FPS changes, the power follows the change in a linear way. Lowering FPS decreases the power consumption. Unfortunately, this decrease in power consumption comes at the price of derogated responsiveness, due to a slower FPS. For that reason a real-time power-performance tradeoff must be kept. The capability of controlled FPS suggests a dynamic way of doing this: the dynamic FPS scaling mechanism, whereby the FPS of a graphics subsystem can be automatically adjusted "on the fly," either lowered to conserve power and reduce the amount of heat generated at the cost of responsiveness, or increased to improve the responsiveness. Such a dynamic FPS scaling would be important in laptops, tablets and other mobile devices, where energy comes from a battery and thus is limited. It can also be used in quiet computing settings that need low noise levels, such as video editing, sound mixing, home servers, and home theater PCs. A typical quiet PC uses quiet cooling and storage devices and energy-efficient parts. Less heat output, in turn, allows the system cooling fans to be throttled down or turned off, reducing noise levels and further decreasing power consumption.

In some embodiments of the present invention, the capability of altering the FPS is applied to controlling the power consumption of the system. In concise mode the FPS is raised by dropping some frames or cutting parts thereof. As a result, when at a given FPS, the GPU power consumption in concise mode is compared with the GPU power consumption in native mode; the consumption at concise mode is apparently lower, saving power. This is evident from the table of FIG. 9, for the graphics application of the video game Call of Duty 4. The frame rate of concise mode grows from 138 FPS to 310 FPS (growth of over 124%), resulting in GPU power reduction from 84.6 W to 62.4 W, or over 26%. Such a reduced GPU power should be significant for the overall computing system, as the GPU typically is the main power consumer.

Unfortunately, the total power consumption does not drop in the same ratio, because of the second largest power consumer in the system, the CPU. Following the increased FPS, the CPU needs to work harder, preparing more frames per time unit for the GPU, resulting in intensified power consumption. This is evident from FIG. 9; the CPU power increases from 19.19 W in native mode to 25.7 W in concise mode, a growth of 31.7%. On the whole, the power gain of the CPU is balanced by the power loss of GPU, and the resulting power drop is only 15.6%.

The way to save the power gain of the GPU is by artificially reducing the power consumption of the CPU, without interfering with the CPU's work on behalf of graphics. Usually, each frame processed by the GPU has to be pre-processed by the CPU, transferred to the GPU for rendering, and finally sent from the GPU to display by the Present call. The frame rendering period at the GPU overlaps with the CPU pre-processing of the successive frame. Typically, the pre-processing time at the CPU is shorter, terminating at some time before the present call, resulting in a CPU idle period. According to an embodiment of present invention the CPU is shut down during that idle period, by an issued Sleep(X MS) command (also called CPU bubbles). This is shown in FIG. 9, in the "Concise, sleep (3 ms)" row. In the given example, at all frames the CPU was sent to sleep for 3 msec. before the present command. As a result, the saving of CPU power was improved dramatically; its power consumption dropped over ~28% below the native mode, and ~50% below the concise no-sleep mode. Simultaneously the frame rate lowered to 165 FPS, still better than native mode. The aggregated power savings of GPU and CPU, is ~29% of the native power.

Implementation

The preferred embodiment of Virtual V-sync of the present invention comprises GPU-related graphics contexts, and CPU-related tasks to manage the graphics contexts. There are two graphics contexts:

(i) The Rendering Context, for rendering the input data and storing the resulting frame image in the back buffer, and
(ii) The Display Context, for transferring the back buffer to the display device, while the transfer is synchronized with display refresh rate.

The Rendering Context is managed by a series of CPU tasks: (i) decision making on dropping frames or shortening frames (ii) testing inter-frame dependencies, (iii) modifying frames accordingly, (iv) feeding the GPU with data and commands, and (v) transferring the final back buffers to presenting frames. A series of tasks are required to manage the Display Context: (i) receive rendered frames from the rendering context. (ii) Managing the back buffers swap chain, and (iii) controlling the Display Sync.

Figure 10B:
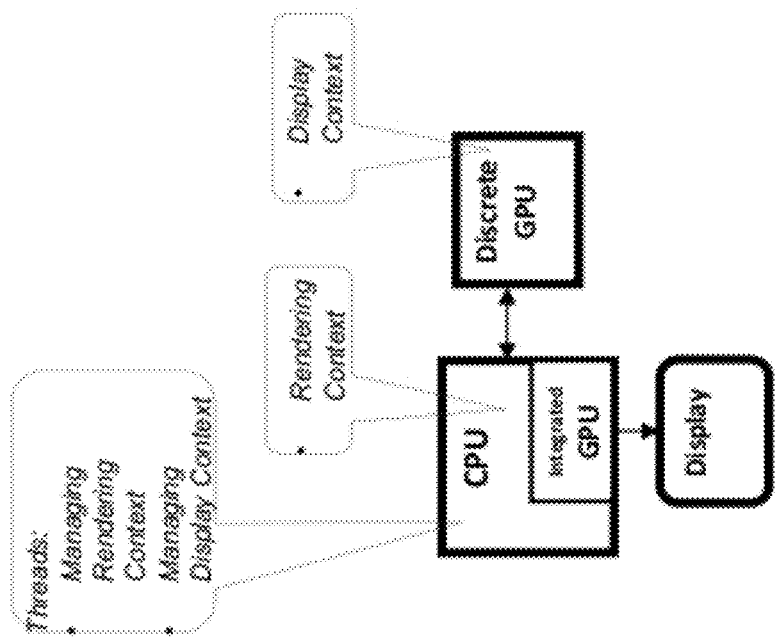
FIG. 10b. Implementation on a dual GPU system.
Figure 10A:
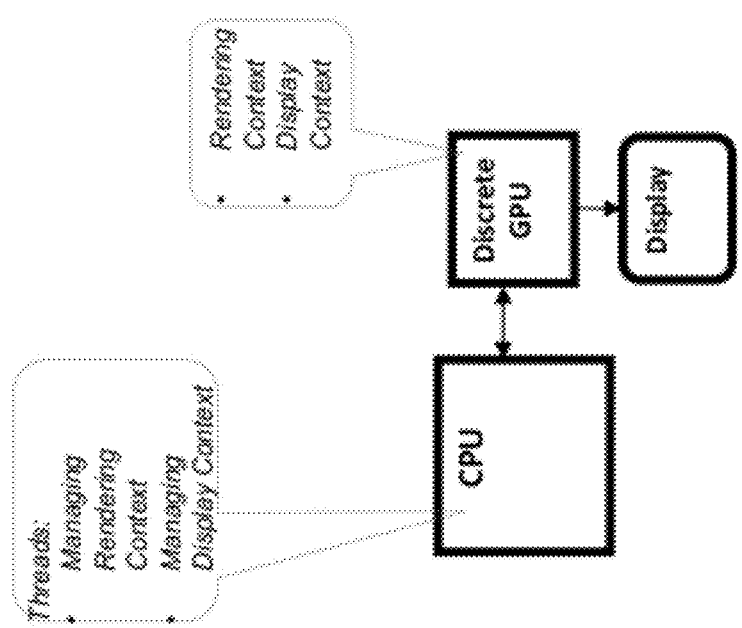
FIG. 10a. Implementation on a discrete GPU system.

FIGS. 10a and 10b demonstrate two preferred system embodiments of the present invention, based on off-the-shelf components, such as multicore chips, CPU and GPU fusion chips, discrete GPUs, etc. FIG. 10a illustrates a graphics system comprising CPU, discrete GPU and Display. The display is connected to the GPU. Both graphic contents run on a single GPU, managed by two CPU threads. Rendering always is the primary context on a GPU, while rendering performance is of main concern in real-time graphics applications. However, in this embodiment the GPU is underutilized in regard to rendering, due to the time spent on the Display Context. FIG. 10b illustrates a more efficient, dual GPU system: a hybrid chip having at least one CPU and an integrated GPU, and a separate discrete GPU. The display connects to the integrated GPU. The discrete GPU runs the Rendering Context, undisturbed by the Display Context, which runs on the integrated GPU. Both contexts are managed by two CPU threads.

What is claimed is:

1. A method for enhancing frame rate in graphics systems comprising:
    generating application frames independently of a monitor refresh rate, while actual frames are displayed at screen refresh rate;
    removing frame blocking;
    preventing excessive application-generated frames from being displayed, and;
    dropping undisplayed frames while resolving inter-frame dependency between the to-be-dropped frame and its successive frames, wherein:
        (i) in the event of lack of inter-frame dependency between the to-be-dropped frame and its successive frames, the to-be-dropped frame is dropped without shortening; and
        (ii) in the event of inter-frame dependency between the to-be-dropped frame and its successive frames, the to-be-dropped frame is shortened while keeping relevant render target tasks such that artifacts due to the to-be-dropped frame will be prevented.

2. The method of claim 1, wherein the actual frame rate of a graphics system equals a monitor's refresh rate.

3. The method of claim 1, wherein the removal of frame blocking increases responsiveness.

4. The method of claim 3, wherein the increased responsiveness is at the responsiveness level of a graphics system without a v-sync solution.

5. The method of claim 1, wherein the application frame rate is higher than the monitor's refresh rate.

6. The method of claim 5, wherein an application-generated frame rate is synchronized with the screen refresh rate.

7. The method of claim 1, wherein the application frame rate can reach the non-v-sync unlimited frame rate.

8. The method of claim 1, wherein performance limitation due to vertical-sync is reduced.

9. The method of claim 1, wherein tearing artifacts are eliminated.

10. The method of claim 1, wherein a frame generated by an application is subject to be displayed if at the time of display the screen is available.

11. The method of claim 1, wherein a frame generated by an application is subject to being dropped if at the time of display the screen is unavailable.

12. The method of claim 1, wherein a frame generated by an application is subject to display depending on the time remaining on the currently displayed frame.

13. The method of claim 1, wherein the time remaining for a currently displayed frame was assessed in advance to assist in a displaying decision.

14. The method of claim 13, wherein the frame is generated in its entirety if the frame was assessed to be displayed.

15. The method of claim 13, wherein a frame to be dropped is shortened by turning non-operational tasks that are not required for subsequent frames.

16. The method of claim 15, wherein the inter-frame dependency related to the to-be-dropped frame is revealed and solved, thereby reducing artifacts.

17. The method of claim 16, wherein a render target task in the to-be-dropped frame that causes an inter-frame dependency in subsequent frames is kept as part of the shortened frame.

18. The method of claim 17, wherein the said shortened frame is dropped.

19. The method of claim 1, wherein input lag due to v-sync of prior art is reduced.

* * * * *